(12) United States Patent
Mayer et al.

(10) Patent No.: US 11,112,019 B2
(45) Date of Patent: Sep. 7, 2021

(54) INTEGRAL CHECK VALVE

(71) Applicant: McGuire Manufacturing Co., Inc., Cheshire, CT (US)

(72) Inventors: Kevin Mayer, Cheshire, CT (US); Robert B. Williams, Jr., Madison, CT (US)

(73) Assignee: McGuire Manufacturing Co., Inc., Cheshire, CT (US)

(*) Notice: Subject to any disclaimer, the term of this patent is extended or adjusted under 35 U.S.C. 154(b) by 2 days.

(21) Appl. No.: 16/654,843

(22) Filed: Oct. 16, 2019

(65) Prior Publication Data

US 2020/0124191 A1 Apr. 23, 2020

Related U.S. Application Data

(60) Provisional application No. 62/746,588, filed on Oct. 17, 2018.

(51) Int. Cl.
*F16K 15/06* (2006.01)
*F16K 1/42* (2006.01)
*F16K 27/02* (2006.01)

(52) U.S. Cl.
CPC ............ *F16K 15/063* (2013.01); *F16K 1/422* (2013.01); *F16K 27/0209* (2013.01)

(58) Field of Classification Search
CPC ..... F16K 15/063; F16K 27/0209; F16K 1/422
See application file for complete search history.

(56) References Cited

U.S. PATENT DOCUMENTS

| | | | |
|---|---|---|---|
| 4,805,661 A | 2/1989 | Knapp et al. | |
| 5,662,276 A | 9/1997 | Ko | |
| 5,699,832 A | 12/1997 | Burchard et al. | |
| 6,626,208 B2 | 9/2003 | Chen | |
| 9,732,866 B2 | 8/2017 | Dolgos | |
| 2005/0098216 A1* | 5/2005 | Bodie | F16K 17/06 137/540 |
| 2009/0301584 A1* | 12/2009 | McKee | F16K 17/04 137/541 |
| 2019/0162328 A1* | 5/2019 | Gilbert | F16K 31/365 |

* cited by examiner

*Primary Examiner* — Kevin L Lee
(74) *Attorney, Agent, or Firm* — Wiggin and Dana LLP; Gregory S. Rosenblatt

(57) ABSTRACT

An integral check valve has a stem with a first interior bore extending longitudinally inward from a first end thereof and a spindle having a central shaft having a first end and an opposing second end with flange circumscribing the central shaft. The interior bore is sized to receive the stem and a portion of the central shaft extending from the first end to the flange. The integral check valve may be a component of a plumbing fixture that further includes a hollow body having a water inlet, a water outlet and an integral check valve receiving conduit. The integral check valve receiving conduit has threads sized to engage the outwardly extending threads of the stem.

17 Claims, 9 Drawing Sheets

INTEGRAL CHECK VALVE

CROSS-REFERENCE TO RELATED PATENT APPLICATION

This patent application claims a benefit to the Oct. 17, 2018 filing date of U.S. Provisional patent application Ser. No. 62/746,588 titled, "Check Valve." The disclosure of U.S. 62/746,588 is incorporated by reference herein in its entirety.

Check valves are used to connect a water line to a faucet and have several functions. One primary function of the valve is to turn the water off and on. A primary function of the check feature is to prevent a backflow of water from the faucet outlet, or other plumbing fixture, back into the water line.

One check valve assembly is disclosed in U.S. Pat. No. 5,699,832, titled "Faucet Water Input Connection," to Burchard et al., that is incorporated by reference herein in its entirety. Existing check valves have many intricate components and a design that is expensive to manufacture. In addition, having more components in a check valve can result in greater probability for wear and eventually failure.

SUMMARY OF THE DISCLOSURE

Disclosed herein is an integral check valve. This check valve has a stem with a first interior bore extending longitudinally inward from a first end thereof and a spindle having a central shaft having a first end and an opposing second end with flange circumscribing the central shaft. The interior bore is sized to receive the stem and a portion of the central shaft extending from the first end to the flange.

Also disclosed herein is a plumbing fixture that has an integral check valve with a stem. The stem has a first interior bore extending longitudinally inward from a first end thereof and threads extending outward from a surface adjacent the first end thereof. A hollow body has a water inlet, a water outlet and an integral check valve receiving conduit. The integral check valve receiving conduit has threads sized to engage the outwardly extending threads of the stem.

The hollow body may further include a shut-off handle to prevent the flow of water into the water inlet to facilitate repair or inspection of the fixture.

DETAILED DESCRIPTION

Figure 1:
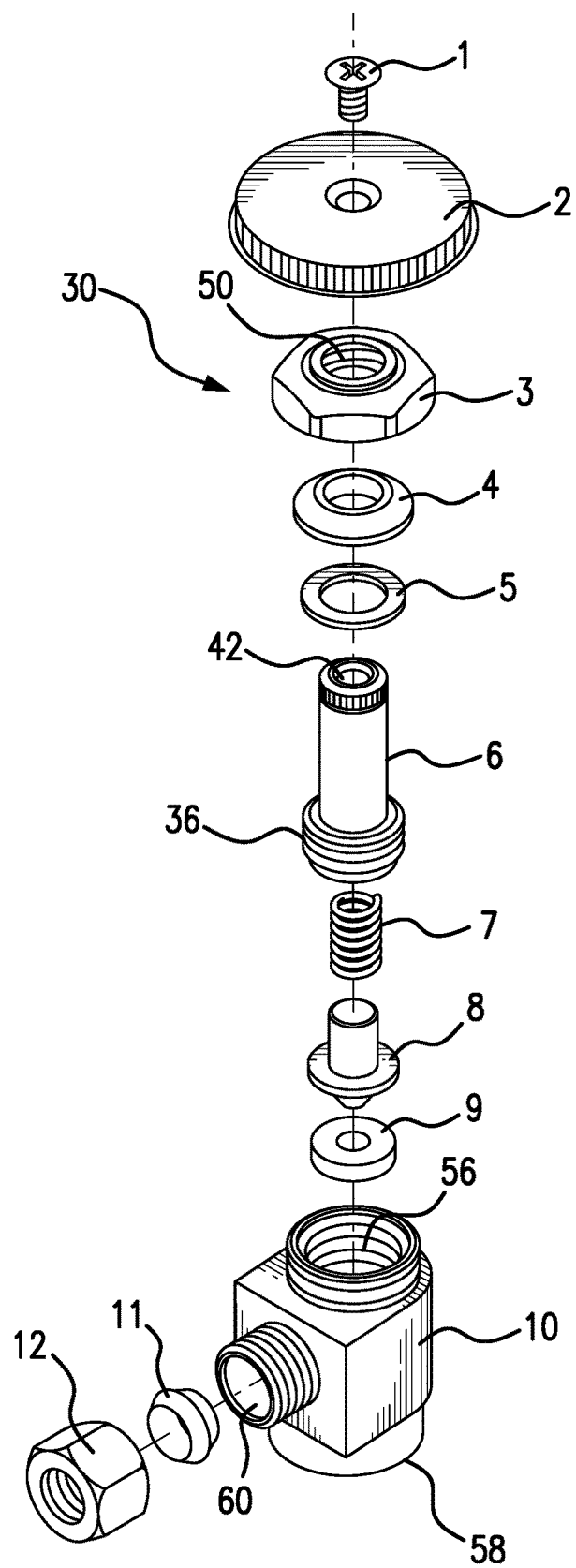
FIG. 1 is an exploded view of an integral check valve in accordance with a first embodiment.
Figure 2:
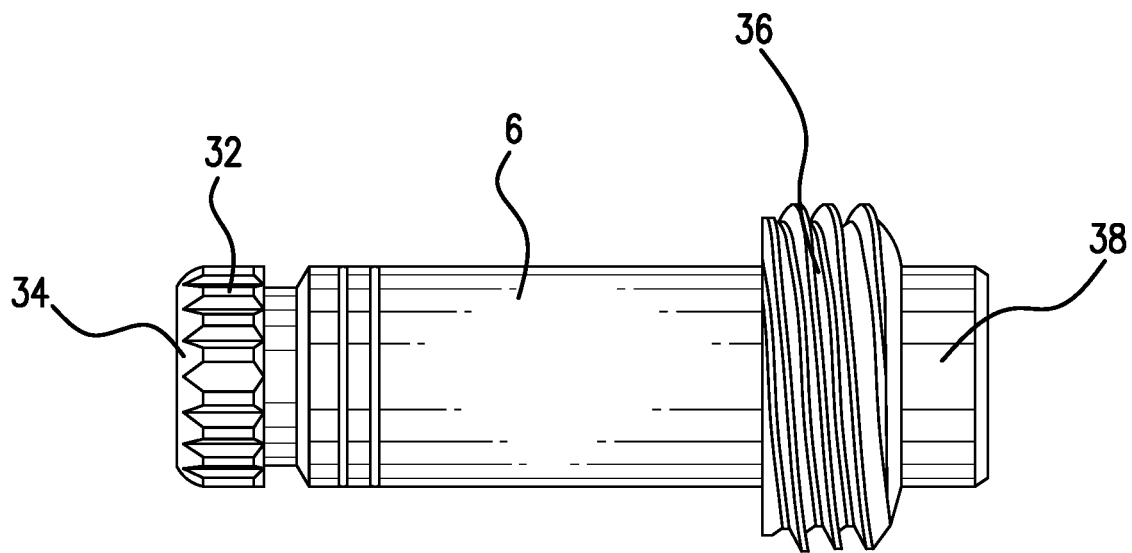
FIG. 2 is a perspective drawing showing an exterior view of a stem component of the integral check valve of FIG. 1.
Figure 3:
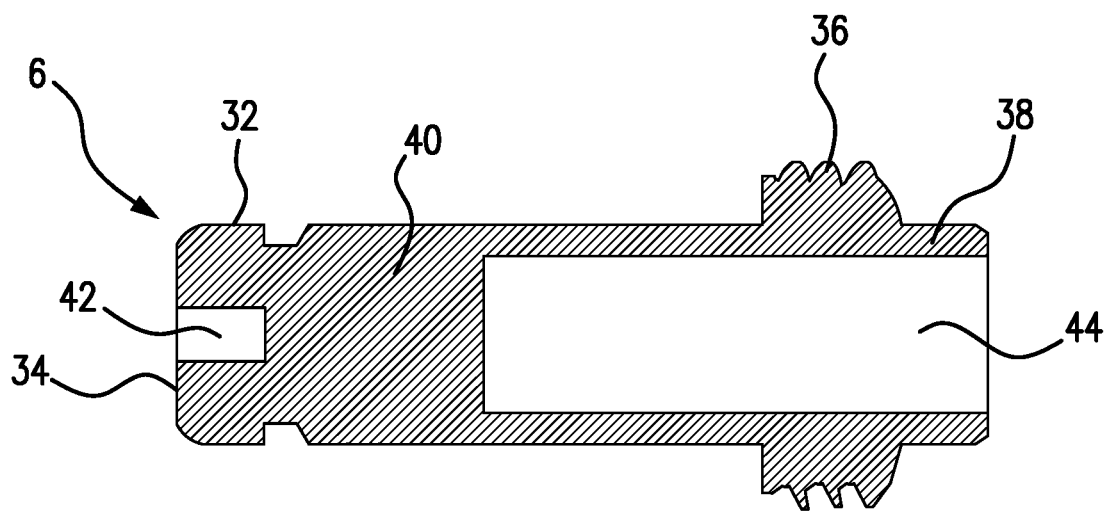
FIG. 3 is a cross-sectional view of the stem illustrated in FIG. 2.

FIG. 1 is an exploded view of an integral check valve in accordance with a first embodiment. A stem 6 is presented in more detail in FIGS. 2, 3, 10 and 11. In one embodiment, the stem 6 has a ferrule portion 32 at one end for engaging a bonnet 3 (FIG. 1) and external threads 36 for engaging a body 10 (FIG. 1). The stem further includes two blind bores 42, 44 separated by a solid portion 40 and aligned along longitudinal axis 41. A first blind bore 44 extends into the solid portion from the second end 38 and receives both a spring 7 and a spindle 8 (FIG. 1). The stem is formed from a machinable corrosion resistant material, preferably brass. A second blind bore 42 extends into the solid portion 40 from the first end 34 and receives a screw 1 (FIG. 1).

Figure 4:
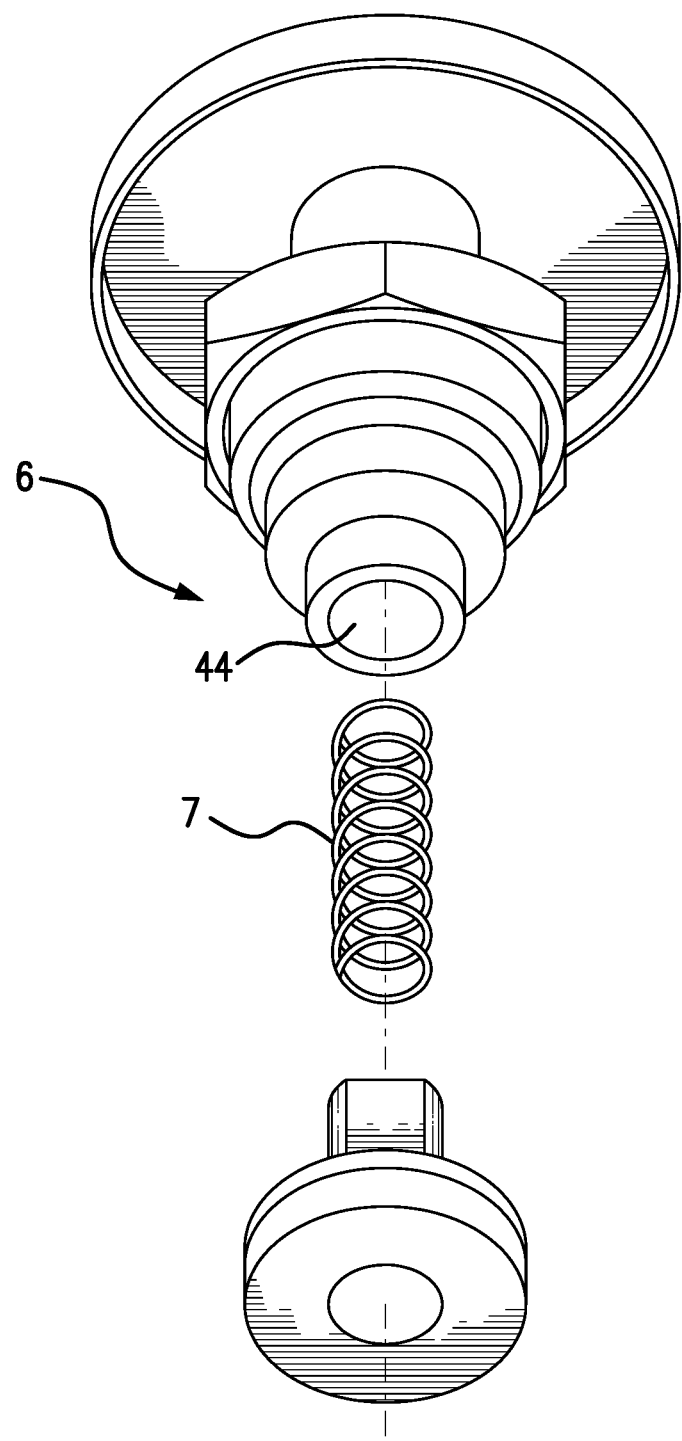
FIG. 4 is a perspective drawing showing a spring and a spindle prior to insertion into a blind bore extending partially through the stem of FIGS. 2 and 3.
Figure 13:
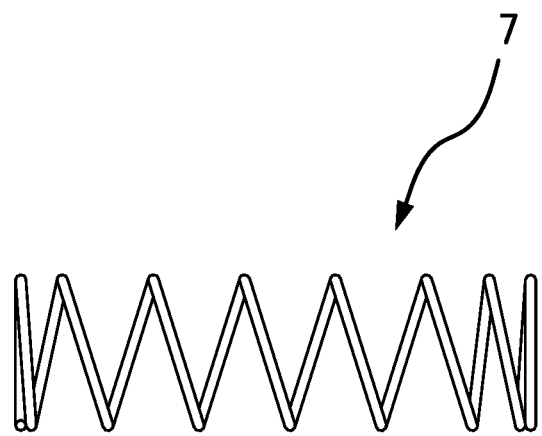
FIG. 13 is an engineering print of a spring for use with the integral check valves disclosed herein.

FIGS. 4 and 13 illustrates the spring 7 having an outside diameter slightly less than the diameter of the first blind bore 44 of the stem 6. The spring is formed from a high strength, corrosion resistant material, such as stainless steel. The spring is a compression spring having a compressive force effective to be displaced by incoming water pressure and not be displaced by backflow of water from a water outlet. At typical household water pressures, the compressive force of the spring is nominally one pound (force) per inch (0.002 kgf/mm).

Figure 12:
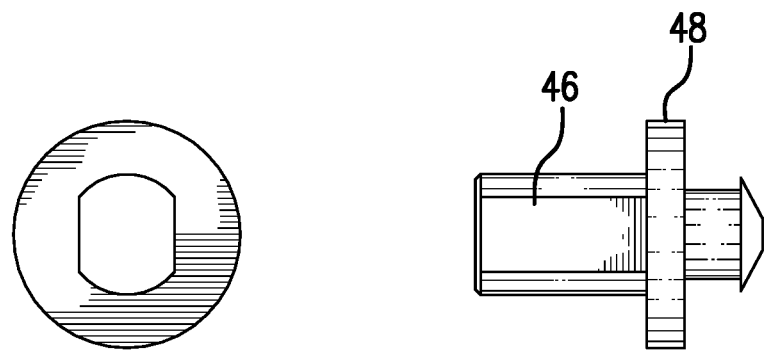
FIG. 12 is an engineering print of a spindle for use with the integral check valves disclosed herein.

The spindle 8 as illustrated in FIGS. 4 and 12, that is formed from a corrosion resistant, machinable material, such as brass, has a central shaft 46 with a diameter slight less than the diameter of the first blind bore 44. Extending outward from the central shaft 46 is a flange 48 with a diameter greater than the diameter of the second blind bore. A set packing 9 formed from a compressible water-proof material, such as ethylene propylene diene monomer rubber (EPDM) circumscribes the central shaft and abuts the flange 48. The outside diameters of the flange 48 and the set packing 9 are approximately equivalent.

Figure 5:
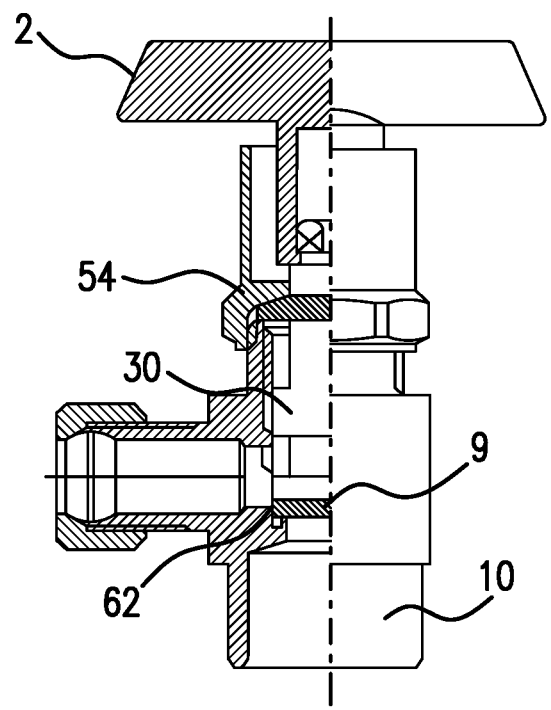
FIG. 5 is a cross-sectional view of the integral check valve of FIG. 1.

Referring back to FIG. 1, bonnet 3 has internal threads 50 to engage the ferrule portion 32 of stem 6 and external threads to engage a handle 2 with the screw 1 effective to tightly engage the components. Typically, bonnet 3 will be formed from brass, handle 2 from a predominantly zinc alloy and screw 1 from stainless steel. Packing 4 and washer 5 engage with an upper housing 54 as shown in FIG. 5. Typically, packing 4 is formed from EPDM and washer 5 from stainless steel.

Again referring to FIG. 1, the external threads 36 of the stem 6 are sized to engage the internal threads 56 of body 10. Body 10 has a water inlet 58 in communication with a water source and a water outlet 60 coupled to a faucet or other fixture via a sleeve 11 and nut 12. Body 10, sleeve 11 and nut 12 are formed from a machinable, corrosion resistant material, such as brass.

Turning the handle 2 in a clockwise direction causes the external threads 36 of the stem 6 to twist down into the body 10 via internal threads 56. The stem 6 is adjusted so that water flowing into the water inlet 58 has sufficient pressure to push the spindle 8 upwards against the compressive force of spring 7 allowing water to flow out the water outlet 60.

When the water pressure drops, spring 7 causes the spindle to reciprocate into the body 10 and compressible set packing 9 and flange 48 seal the water inlet 58 and prevent a backflow of water from the water outlet 60 into the water line by way of water inlet 58.

Figure 6:
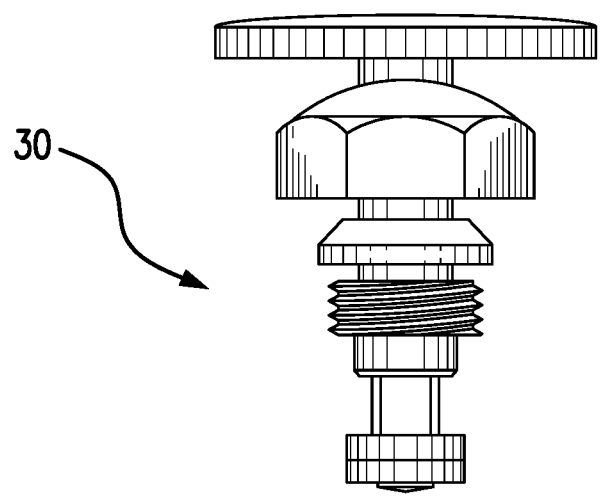
FIG. 6 is a perspective drawing of a portion of the integral check valve of FIG. 1.

FIG. 5 is a cross sectional view of the integral check valve 30 and shows a water-tight seal 62 between the body 10 and the set packing 9 when the spring is extended. FIG. 6 is a photograph showing an assembled integral check valve 30 removed from body 10.

Figure 7:
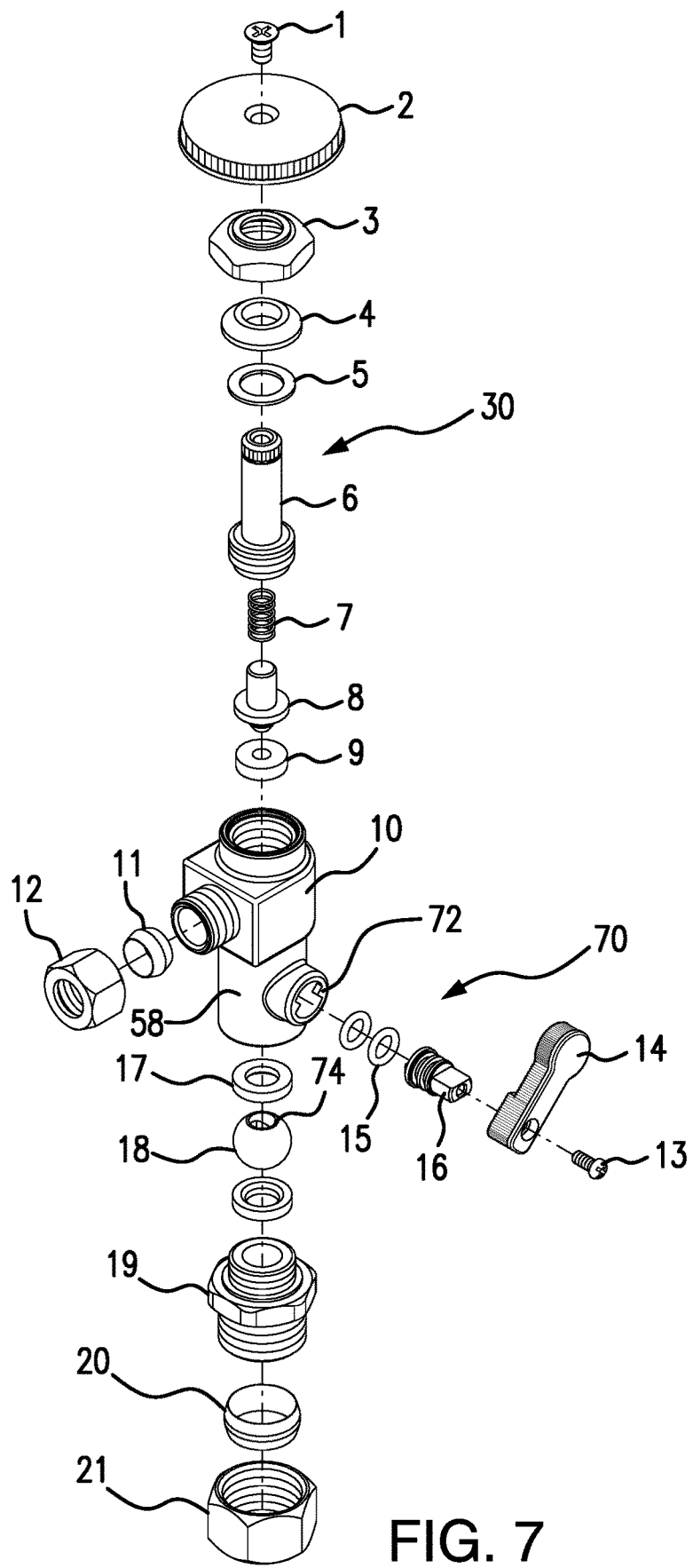
FIG. 7 is an exploded view of an integral check valve in accordance with a second embodiment.

FIG. 7 is an exploded view of an integral check valve in accordance with a second embodiment. The integral check valve 30 is similar to that described above. A shut-off system 70 is included. With the shut-off system 70, water inflow may be terminated at the body 10 for replacement or repair of the integral check valve 30. In this way, only water to the body 10 is interrupted, water flow through the remainder of the structure, such as a house, is not affected.

The exemplary shut-off system 70 includes a stem 16 that is rotated into a secondary opening 72 formed through the water inlet 58. Shut-off handle 14 is affixed to the stem 16 by screw 13 and a water tight seal formed via o-rings 15. Typically, the shut-off handle is formed from a predominantly zinc alloy, the stem from brass, the screw from stainless steel and the o-rings from acrylonitrile butadiene rubber (NBR).

A rotating ball 18 is supported within the water inlet by a compression fit formed by compression fixture 19, compression ring 20 and compression nut 21. A polytetrafluoroethylene (PTFE) washer 17 provides a reduced friction seal for the ball 18. Rotation of handle 14 rotates the ball 18. Only when through-hole 74 is aligned with the water inlet will water flow into the body 10. Otherwise, there the water flow will be impeded. Typically, the ball 18, compression fixture 19, compression ring 20 and compression nut 21 are all formed from brass.

Figure 8:
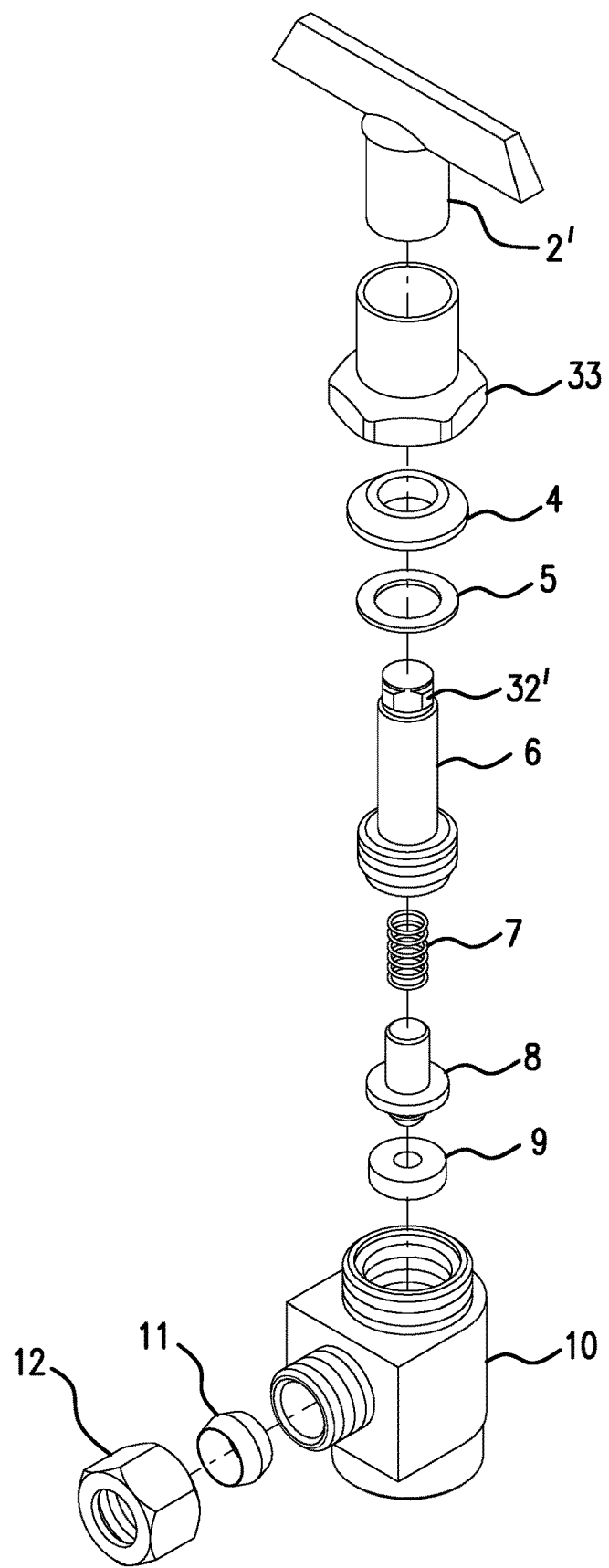
FIG. 8 is an exploded view of the integral check valve of FIG. 1 with a removable key rather than handle.
Figure 9:
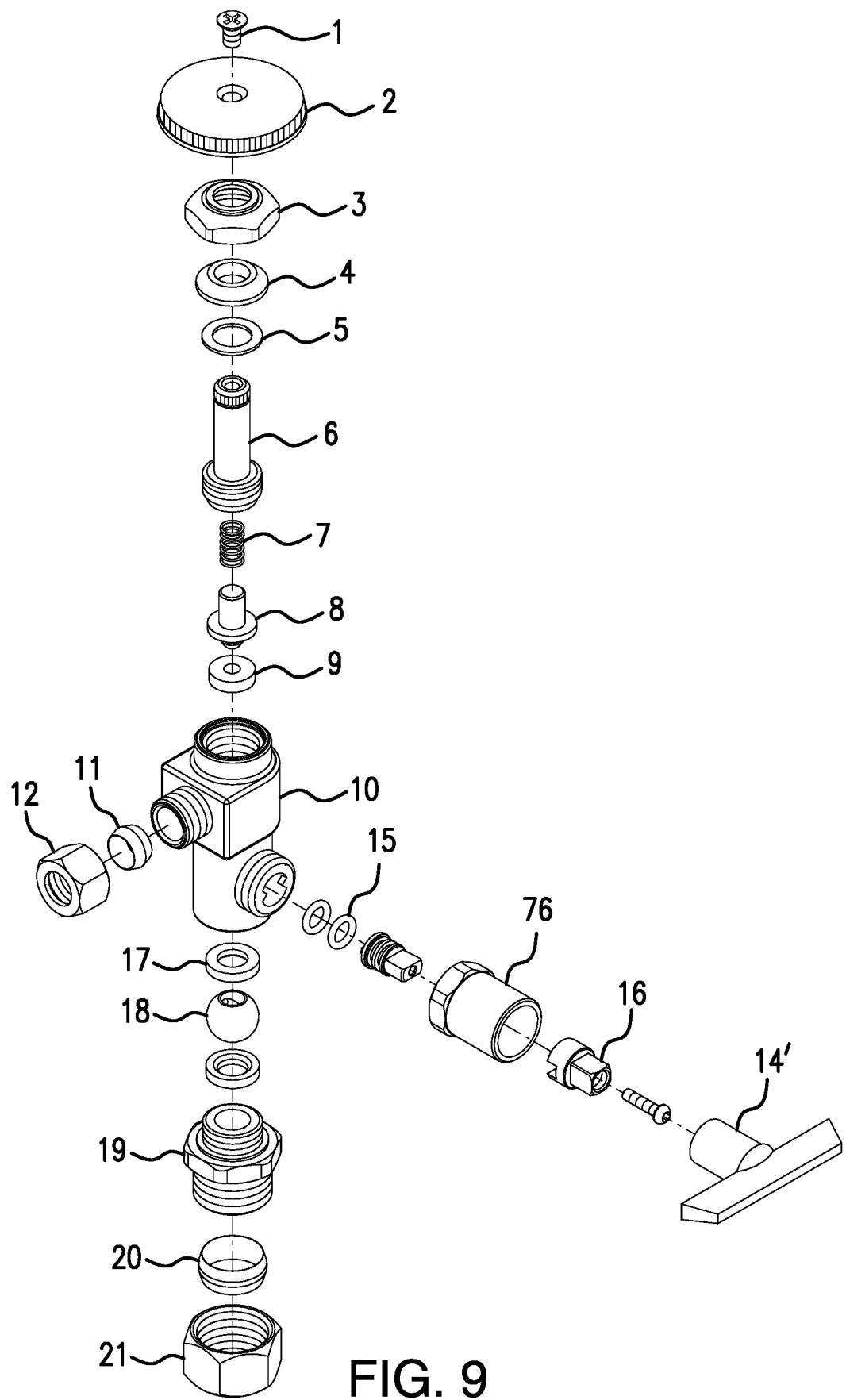
FIG. 9 is an exploded view of the integral check valve of FIG. 7 with a removable key rather than shut-off handle.
Figure 10:
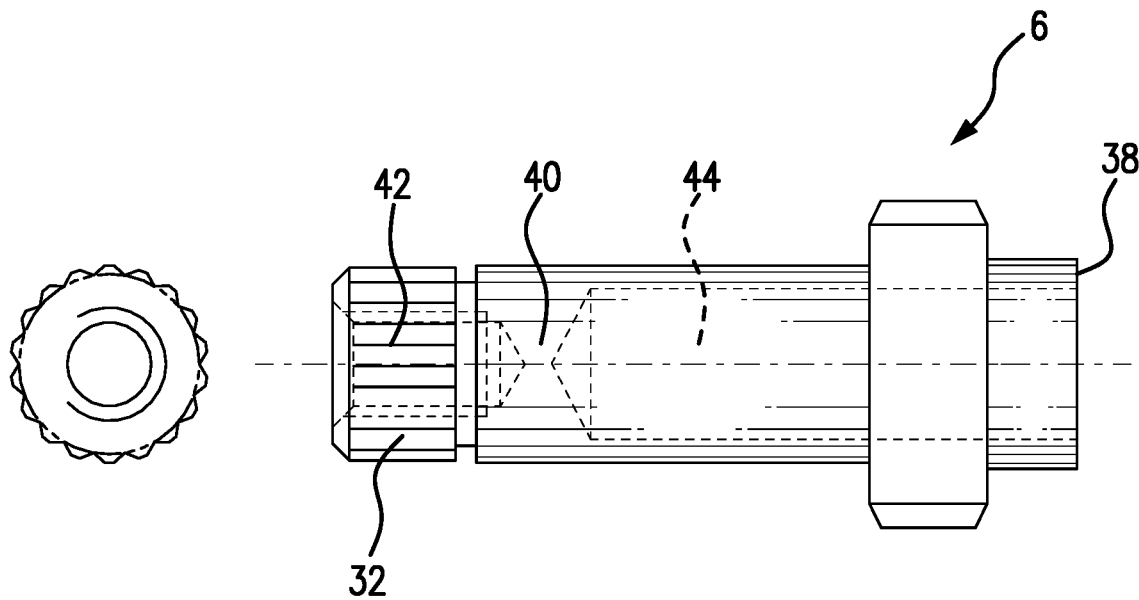
FIG. 10 is an engineering print of a stem for use with the integral check valve of FIG. 1.
Figure 11:
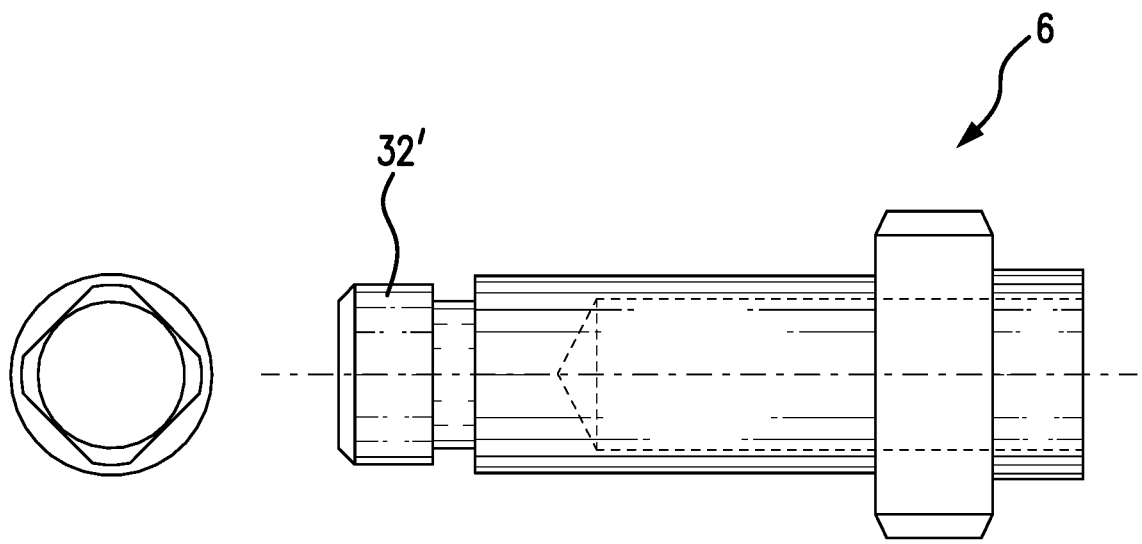
FIG. 11 is an engineering print of a stem for use with the integral check valve of FIG. 8.

With reference to FIGS. 8 and 9, handle 2 and shut-off handle 14 may be replaced with a removeable key 2', 14' in combination with a bonnet 33, 76. The removeable key prevents tampering which may be a problem in a public locations, such as a public restroom.

We claim:

1. An integral check valve, comprising:
    a stem having a first interior bore extending longitudinally inward from a first end thereof;
    a spindle with a central shaft having a first end and an opposing second end with a flange circumscribing the central shaft adjacent the second end; and
    a compressible spring circumscribing a portion of the central shaft between the first end and the flange;
    wherein the interior bore is sized to receive the portion of the central shaft extending from the first end to the flange and the compressible spring.

2. The integral check valve of claim 1 wherein threads extend outward from a surface adjacent the first end thereof.

3. The integral check valve of claim 2 wherein a conformable set packing circumscribes the central shaft of the spindle between the flange and the second end.

4. The integral check valve of claim 3 wherein a handle engages an opposing second end of the stem.

5. A plumbing fixture, comprising:
    an integral check valve with:
        a stem having a first interior bore extending longitudinally inward from a first end thereof and threads extending outward from a surface adjacent the first end thereof,
        a spindle with a central shaft having a first end and an opposing second end with a flange circumscribing the central shaft adjacent the second end, and
        a compressible spring circumscribing a portion of the central shaft between the first end and the flange; and
    a hollow body having a water inlet, a water outlet and an integral check valve receiving conduit, the integral check valve receiving conduit having threads sized to engage the outwardly extending threads of the stem.

6. The plumbing fixture of claim 5 wherein a compressive force of the spring is effective to be displaced by incoming water pressure and not be displaced by backflow of water from the water outlet.

7. The plumbing fixture of claim 6 wherein a handle engages an opposing second end of the stem.

8. The plumbing fixture of claim 7 wherein the integral check valve is configured such that rotation of the handle causes rotation of the threads of the stem within the threads of the check valve receiving conduit.

9. The plumbing fixture of claim 8 wherein a conformable set packing circumscribes the central shaft of the spindle between the flange and the second end.

10. A plumbing fixture, comprising:
    an integral check valve with:
        a stem having a first interior bore extending longitudinally inward from a first end thereof and threads extending outward from a surface adjacent the first end thereof,
        a spindle with a central shaft having a first end and an opposing second end with a flange circumscribing the central shaft adjacent the second end, and
        a compressible spring circumscribing a portion of the central shaft between the first end and the flange; and
    a hollow body having a water inlet, a water outlet, a secondary opening and an integral check valve receiving conduit, the integral check valve receiving conduit having threads sized to engage the outwardly extending threads of the stem.

11. The plumbing fixture of claim 10 wherein a shut-off handle is configured to regulate a flow of water to the water inlet.

12. The plumbing fixture of claim 11 wherein the shut-off handle is configured such that no water flows to the water inlet when the shut-off handle is in a closed position.

13. The plumbing fixture of claim 12 wherein a compressible spring circumscribes the central shaft of the spindle between the first end and the flange, the spring being sized to fit within the interior bore.

14. The plumbing fixture of claim 13 wherein a compressive force of the spring is effective to be displaced by incoming water pressure and not be displaced by backflow of water from the water outlet.

15. The plumbing fixture of claim 14 wherein a handle engages an opposing second end of the stem.

16. The plumbing fixture of claim 15 wherein the integral check valve is configured such that rotation of the handle causes rotation of the threads of the stem within the threads of the check valve receiving conduit.

17. The plumbing fixture of claim 16 wherein a conformable set packing circumscribes the central shaft of the spindle between the flange and the second end.

* * * * *